(12) United States Patent
Schwarz et al.

(10) Patent No.: US 10,634,053 B2
(45) Date of Patent: Apr. 28, 2020

(54) ELECTRIC WINDMILL PUMP FOR GEARBOX DURABILITY

(71) Applicant: United Technologies Corporation, Hartford, CT (US)

(72) Inventors: Frederick M. Schwarz, Glastonbury, CT (US); Michael E. McCune, Colchester, CT (US)

(73) Assignee: United Technologies Corporation, Farmington, CT (US)

( * ) Notice: Subject to any disclaimer, the term of this patent is extended or adjusted under 35 U.S.C. 154(b) by 922 days.

(21) Appl. No.: 14/976,166

(22) Filed: Dec. 21, 2015

(65) Prior Publication Data

US 2017/0175874 A1 Jun. 22, 2017

(51) Int. Cl.
*F02C 7/06* (2006.01)
*F16H 57/04* (2010.01)
*F02C 7/36* (2006.01)
*F01D 25/20* (2006.01)
(Continued)

(52) U.S. Cl.
CPC ............... *F02C 7/06* (2013.01); *F01D 21/00* (2013.01); *F01D 25/20* (2013.01); *F02C 3/107* (2013.01); *F02C 7/36* (2013.01); *F16H 57/045* (2013.01); *F16H 57/0434* (2013.01); *F16H 57/0435* (2013.01); *F16H 57/0471* (2013.01); *F16H 57/0479* (2013.01); *F05D 2220/76* (2013.01); *F05D 2230/72* (2013.01);
(Continued)

(58) Field of Classification Search
CPC ............. F16H 57/0435; F16H 57/0479; F16H 57/0434; F16H 57/0471; F16H 57/045; F01D 21/00; F01D 25/20; F02C 3/107; F02C 7/06; F02C 7/36; F05D 2270/304; F05D 2230/72; F05D 2220/76; F05D 2260/40311; F05D 2260/98; F05D 2260/4031

See application file for complete search history.

(56) References Cited

U.S. PATENT DOCUMENTS

| 1,871,055 A | 8/1932 | Hasbrouck |
| 2,711,071 A | 6/1955 | Frankel |
| 2,830,668 A | 4/1958 | Gaubis et al. |

(Continued)

FOREIGN PATENT DOCUMENTS

| EP | 1873358 A2 | 1/2008 |
| EP | 2253805 A2 | 11/2010 |

(Continued)

OTHER PUBLICATIONS

Extended European Search Report for EP Application No. 16205255.9, dated May 3, 2017, 7 pages.

*Primary Examiner* — Ted Kim
(74) *Attorney, Agent, or Firm* — Kinney & Lange, P.A.

(57) ABSTRACT

A gas turbine engine installed on an aircraft includes a fan rotor, a turbine rotor, a gearbox, an auxiliary pump, and an electric motor. The gearbox couples the fan rotor to the turbine rotor, the turbine rotor being adapted to drive the fan rotor via the gearbox. The auxiliary pump is configured to circulate lubricating fluid in an auxiliary lubrication system and supplies the gearbox. The electric motor is configured to receive electricity when the aircraft is parked an adapted to drive the auxiliary pump such that the auxiliary pump circulates lubricating fluid while the aircraft is parked.

14 Claims, 4 Drawing Sheets

(51) Int. Cl.
*F02C 3/107* (2006.01)
*F01D 21/00* (2006.01)

(52) U.S. Cl.
CPC ........... *F05D 2260/4031* (2013.01); *F05D 2260/40311* (2013.01); *F05D 2260/98* (2013.01); *F05D 2270/304* (2013.01)

(56) References Cited

U.S. PATENT DOCUMENTS

| | | | |
|---|---|---|---|
| 2,871,981 | A | 2/1959 | Baits |
| 2,984,975 | A | 5/1961 | Rodgers et al. |
| 3,907,386 | A * | 9/1975 | Kasmarik ............. F01D 25/162 |
| | | | 384/559 |
| 4,153,141 | A | 5/1979 | Methlie |
| 4,309,870 | A * | 1/1982 | Guest .................. F01D 25/20 |
| | | | 184/6.11 |
| 4,431,372 | A | 2/1984 | Dadhich |
| 4,446,377 | A | 5/1984 | Kure-jensen et al. |
| 5,107,676 | A | 4/1992 | Hadaway et al. |
| 5,121,598 | A | 6/1992 | Butler |
| 5,433,674 | A | 7/1995 | Sheridan et al. |
| 5,472,009 | A | 12/1995 | Linderoth |
| 5,472,383 | A | 12/1995 | McKibbin |
| 5,588,503 | A | 12/1996 | Rinaldo |
| 5,769,182 | A | 6/1998 | Parenteau |
| 5,911,678 | A | 6/1999 | White |
| 6,223,616 | B1 | 5/2001 | Sheridan |
| 6,267,147 | B1 | 7/2001 | Rago |
| 6,793,042 | B2 | 9/2004 | Brouillet |
| 6,886,324 | B1 | 5/2005 | Handshuh et al. |
| 7,090,165 | B2 * | 8/2006 | Jones .................... B64D 29/08 |
| | | | 244/53 R |
| 7,118,336 | B2 | 10/2006 | Waddleton |
| 7,712,317 | B2 | 5/2010 | Scanlon |
| 7,849,668 | B2 | 12/2010 | Sheridan |
| 8,215,454 | B2 | 7/2012 | Portlock et al. |
| 8,307,626 | B2 | 11/2012 | Sheridan |
| 2003/0187554 | A1* | 10/2003 | Henry .................... B64D 41/00 |
| | | | 701/29.6 |
| 2006/0201173 | A1* | 9/2006 | Leathers ................ B64F 1/364 |
| | | | 62/186 |
| 2006/0260323 | A1 | 11/2006 | Moulebhar |
| 2007/0289310 | A1* | 12/2007 | Dooley .................. F01D 15/10 |
| | | | 60/773 |
| 2010/0023169 | A1* | 1/2010 | Delaloye ................ F01D 25/20 |
| | | | 700/282 |
| 2010/0294597 | A1* | 11/2010 | Parnin .................... F01D 25/18 |
| | | | 184/6.1 |
| 2011/0135500 | A1* | 6/2011 | Kaimer .................. F04B 49/02 |
| | | | 417/44.1 |
| 2013/0048091 | A1* | 2/2013 | DiBenedetto .......... F01D 25/20 |
| | | | 137/2 |
| 2013/0098059 | A1* | 4/2013 | Suciu ...................... F02C 9/16 |
| | | | 60/783 |
| 2013/0195603 | A1 | 8/2013 | Sheridan et al. |
| 2014/0182972 | A1* | 7/2014 | Hetherington ........... F02C 7/06 |
| | | | 184/6.11 |
| 2015/0057858 | A1* | 2/2015 | Nitta ...................... F01M 1/02 |
| | | | 701/22 |
| 2015/0075132 | A1* | 3/2015 | Kohn .................... B64D 29/08 |
| | | | 60/39.08 |
| 2016/0039371 | A1* | 2/2016 | Blumer .................. B60L 11/02 |
| | | | 290/31 |
| 2016/0208651 | A1* | 7/2016 | Dolman .................. F01D 25/20 |
| 2016/0258324 | A1* | 9/2016 | Cigal ..................... F01D 21/00 |

FOREIGN PATENT DOCUMENTS

| | | | |
|---|---|---|---|
| EP | 2584174 A2 | 4/2013 | |
| WO | WO-2015047885 A1 * | 4/2015 | ............ F01D 25/20 |
| WO | WO2015065720 A1 | 5/2015 | |

* cited by examiner

ELECTRIC WINDMILL PUMP FOR GEARBOX DURABILITY

BACKGROUND

The present invention relates generally to gas turbine engine lubrication systems and, more particularly, to systems for lubricating a fan drive gearbox in a geared gas turbine engine.

Gas turbine engines typically include, in axial flow series, a fan rotor, a low pressure compressor, a high pressure compressor, a combustor, a high pressure turbine, and a low pressure turbine. Air entering the low and high pressure compressors is compressed by alternating stages of rotor blades and vanes before entering the combustor. Within the combustor, fuel is injected, and the air is heated through combustion. The high and low pressure turbines expand the heated air to produce work before exhausting air from the gas turbine engine. The turbines produce work which is used to drive the low pressure and high pressure compressors as well as the fan rotor. In some gas turbine engines, a fan drive gearbox couples the fan rotor to the low pressure turbine, which drives the fan rotor. The gas turbine engine produces thrust from air exhausted from the low pressure turbine as well as from air that is driven by the fan and bypasses the engine core. The combination of thrust from bypass air and core air propels aircraft during flight.

During operation of the gas turbine engine, bearings within the fan drive gear box receive lubrication fluid from a main lubrication pump, which is typically driven by either the high pressure turbine or low pressure turbine through gearing. However, when the gas turbine engine is not operating, it may be possible for the fan to rotate without the aid of lubrication from the main lubrication pump. For example, wind blows through fan rotors of parked aircraft, causing rotation, sometimes referred to as windmilling. Windmilling fan rotors can reduce life of bearings within the fan drive gear box, particularly if such aircraft are parked for long periods of time. A need exists, therefore, for an auxiliary lubrication system to provide lubrication to fan drive gear box bearings during conditions when the main lubrication pump is not operating or is incapable of supplying lubrication fluid to the fan drive gearbox.

SUMMARY

A gas turbine engine includes a fan rotor, a turbine rotor, a fan drive gearbox, a main pump, an auxiliary pump, a supply line, and an electric motor. The fan drive gearbox includes a bearing and couples the fan rotor to the turbine rotor, the turbine rotor being adapted to drive the fan rotor via the fan drive gearbox. The main lubrication pump circulates lubricating fluid within a main lubrication system and supplies one or more sumps. The auxiliary pump is configured to circulate lubricating fluid in an auxiliary lubrication system and to supply the fan drive gearbox. The supply line connects an output of the auxiliary pump to a lubricating surface of the bearing. The electric motor is adapted to drive the auxiliary pump.

A turbofan engine installed on an aircraft includes a fan rotor, a turbine rotor, a gearbox, an auxiliary pump, and an electric motor. The gearbox couples the fan rotor and the turbine rotor, the turbine rotor being adapted to drive the fan rotor via the gearbox. The auxiliary pump is configured to circulate lubricating fluid in an auxiliary lubrication system. The electric motor is configured to receive electricity when the aircraft is parked and adapted to drive the auxiliary pump to circulate lubrication fluid while the aircraft is parked.

A method of lubricating a bearing within a gearbox includes supplying power to an electric motor configured to drive an auxiliary pump and using the auxiliary pump to supply lubricating fluid to the bearing of the gearbox. The gearbox has an input shaft coupled to and driven by the turbine rotor and an output shaft coupled to the fan rotor of the gas turbine engine.

DETAILED DESCRIPTION

The present invention provides an auxiliary lubrication system for providing lubricating liquid to bearings of a fan drive gear system in a gas turbine engine. The auxiliary lubrication system includes an auxiliary pump driven by an electric motor that supplements a main pump driven by a high pressure turbine in a main lubrication system. When the main pump provides less than an adequate amount of fluid to the fan drive gear system or when the main pump is deactivated such as when the aircraft is parked, the auxiliary pump provides lubricating fluid to the bearings within the fan drive gear system. Since the electric motor drives the auxiliary pump, the auxiliary pump turns independently from the fan rotor and gears within the fan drive gear system.

Figure 1A:
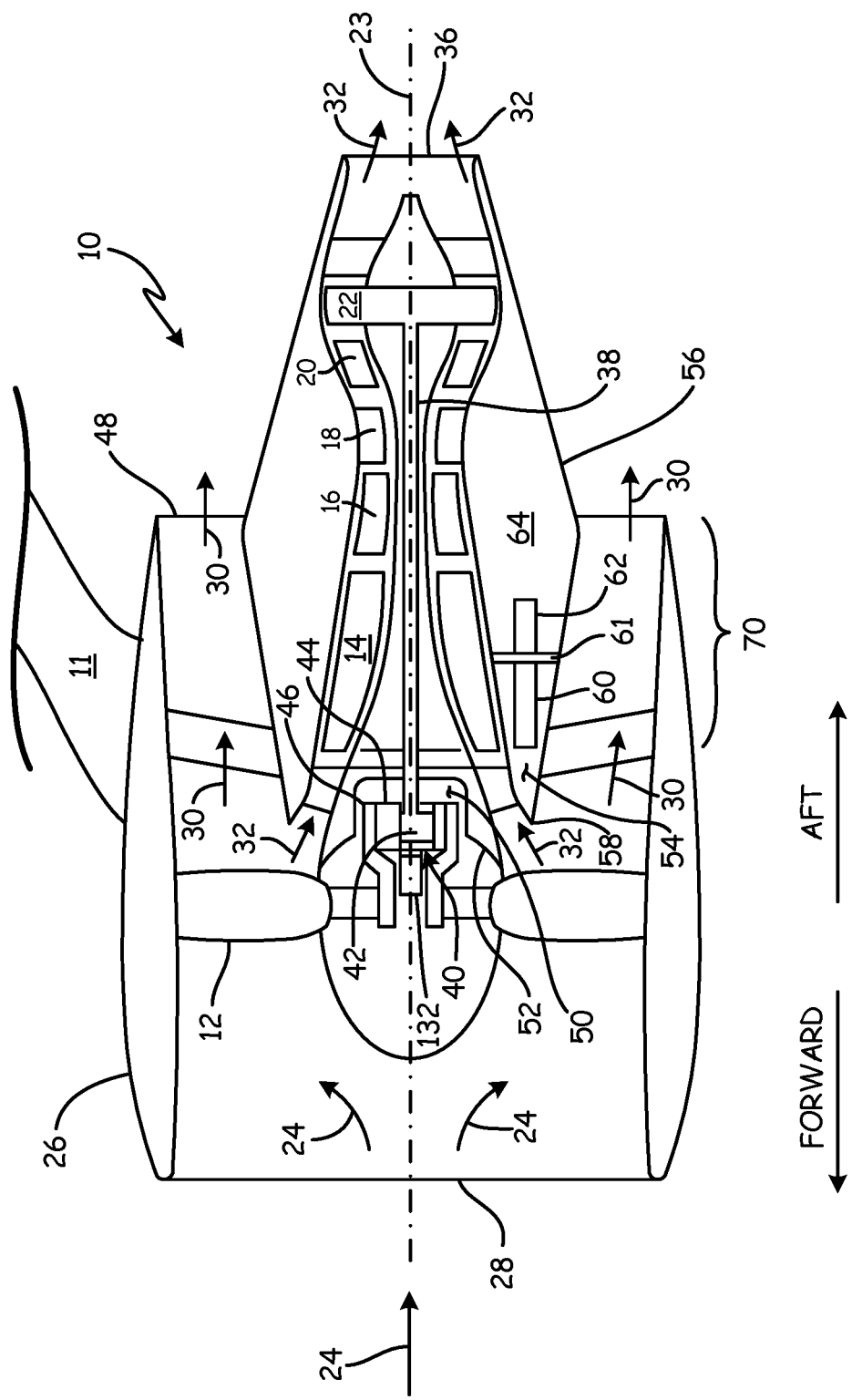
FIG. 1A is a schematic view of a gas turbine engine equipped with an auxiliary pump driven by an electric motor.

FIG. 1A is a schematic view of gas turbine engine 10 shown installed on an aircraft (not shown) at pylon 11. Engine 10 includes, in axial flow series, fan 12, low pressure compressor 14, high pressure compressor 16, combustor 18, high pressure turbine 20, and low pressure turbine 22, which are concentrically disposed about centerline axis 23 of gas turbine engine 10. During operation of gas turbine engine 10, fan 12 draws air 24 into nacelle 26 at inlet 28. Air 24 exiting fan 12 is divided into bypass air 30 and core air 32.

Low pressure compressor 14 and high pressure compressor 16 increase the pressure of core air 32 before it enters combustor 18 where fuel is added and combustion heats core air 32. Heated core air 32 expands across high pressure turbine 20 and low pressure turbine 22 before exhausting through nozzle 36. High pressure turbine 18 is coupled to high pressure compressor 16 via a shaft (not shown), sometimes referred to as a high pressure spool, and low pressure turbine 22 is coupled to low pressure compressor 14 via shaft 38, sometimes referred to as a low pressure spool, thereby driving high compressor 18 and low pressure compressor 14, respectively, to facilitate further compression of core air 32. Core air 32 exhausted from nozzle 36 produces thrust for gas turbine engine 10.

At a forward end of shaft 38, low pressure turbine 22 is coupled to fan drive gearbox 40, which in some embodiments includes an epicycle gear train. In such embodiments, fan drive gear box 40 includes sun gear 42 joined with shaft 38, planet gears 44 circumferentially disposed about and enmeshed with sun gear 42, and ring gear 46 enmeshed with planet gears 44 and coupled to fan 12. Thus, core air 32 expanding across and driving low pressure turbine 22 drives fan 12 via fan drive gearbox 40. Rotation of fan 12 produces bypass air 30, which is discharged from nacelle 26 at nozzle 48, also producing thrust.

Compartment 50 encloses fan drive gearbox 40 and can be formed by portions of gas turbine engine 10 that surround gearbox 40 in which various components and seals are arranged to contain lubrication fluid supplied by the main lubrication system. In some embodiments, compartment 50 is formed by portions of inner casing 52, shaft 38, and fan 12 as shown in FIG. 1A. Auxiliary reservoir 54 communicates with compartment 50 and is positioned such that lubrication fluid collects therein. In some embodiments, auxiliary reservoir 54 is placed within outer casing 56 and placed in communication with compartment 50 via strut 58, which extends in a generally radial direction with respect to centerline 23 from inner casing 52 to outer casing 56. At least a portion of strut 58 is hollow to allow lubrication fluid from compartment 50 to enter auxiliary reservoir 54. To facilitate lubrication fluid transfer between compartment 50 and auxiliary reservoir 54, particularly when the aircraft is parked, auxiliary reservoir 54 is placed below compartment 50 relative to an installed condition of gas turbine engine 10. With this arrangement, auxiliary reservoir 54 is gravity fed from compartment 50.

As will be described in further detail below with reference to FIG. 2, when the aircraft is parked, the main pump does not supply lubrication to fan drive gearbox 40. When ambient conditions, such as local wind conditions, cause air 24 to pass through gas turbine engine 10, air 24 causes fan 12, fan drive gearbox 40, and low pressure spool (i.e., shaft 38, low pressure compressor 14, and low pressure turbine 20) to rotate without being driven by the low pressure turbine 22. This condition is sometimes referred to as fan windmilling, and depending on wind speed and direction, can rotate fan 12 counterclockwise or clockwise about centerline 23. Typically, fan 12 rotates up to speeds of sixty revolutions per minute or between six and seven radians per second during low to medium fan windmilling conditions.

To supply lubrication to bearings (not shown) within fan drive gearbox 40 during fan windmilling, pump 60 is driven by electric motor 62. Pump 60 is placed within auxiliary reservoir 54, and electric motor 62 is placed within interior 64 of gas turbine engine 10, separated from auxiliary reservoir 54 by bulkhead 61. In some embodiments, auxiliary reservoir 54 is formed within outer casing 56 which is disposed radially outward with respect to inner casing 52 and placed below compartment 50 with respect to an installed and parked orientation of gas turbine engine 10.

Moreover, some embodiments position electric motor 62 within a portion of interior 64 that is accessible from the exterior of engine 10 without requiring removal of engine 10 from the aircraft. For instance, gas turbine engines commonly include engine panels positioned at key locations along the exterior of nacelle 26 and/or outer casing 54. Each engine panel is moveably attached to gas turbine engine 10 such that the engine panel can be placed in an open position and closed position. In the open position, portions of interior 64 are accessible from the exterior of gas turbine engine 10 when it is installed on the aircraft or alternatively, when it is installed on maintenance equipment, such as engine test stands and engine carts. Components which can be accessed in this way are sometimes called line replacement units because inspection, maintenance, and repair tasks can be completed without disassembly of substantial portions of gas turbine engine 10. Placing electric motor 62 in an easily-accessible location within engine 10 decreases maintenance costs and service time associated with maintaining engine 10.

Figure 1B:
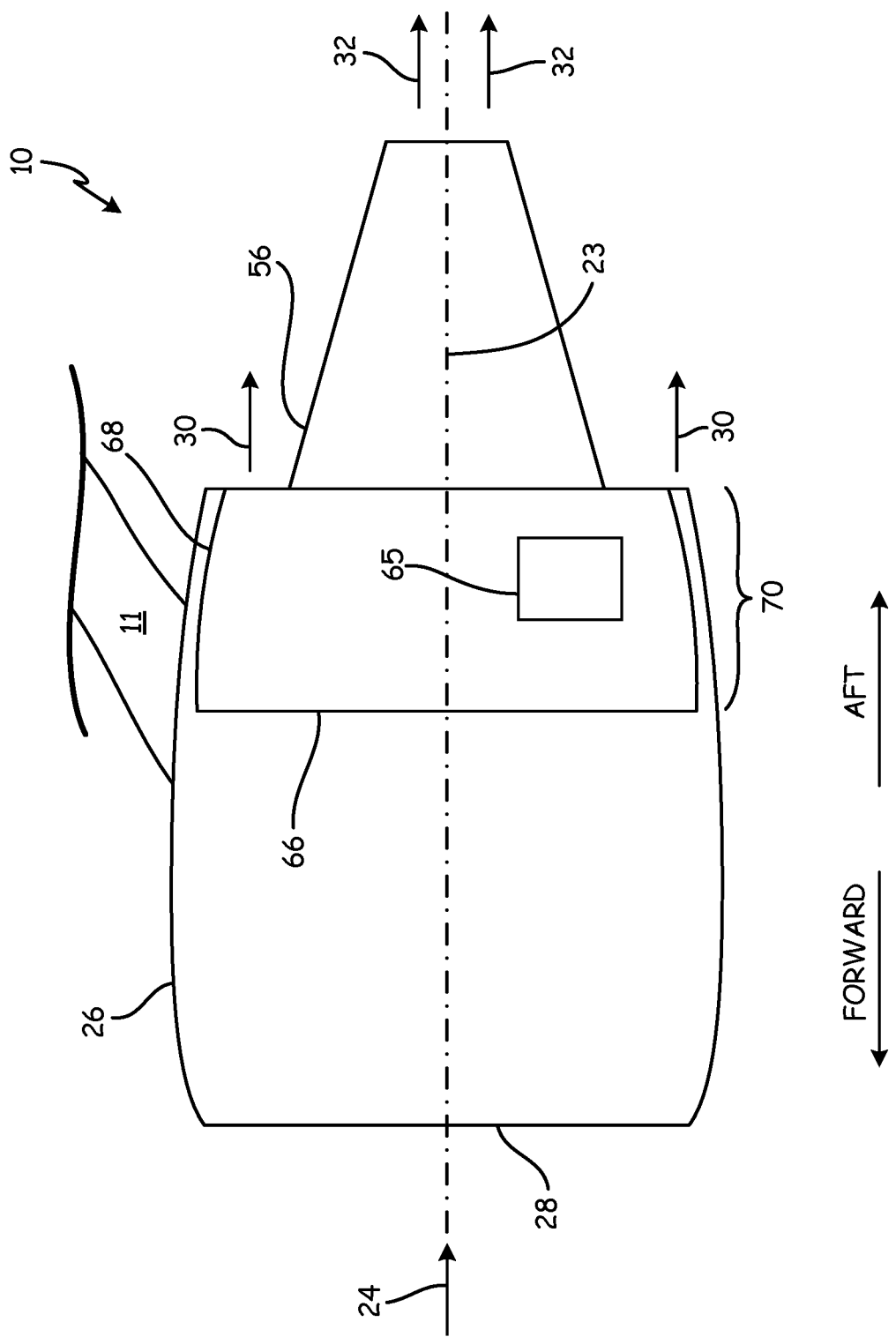
FIG. 1B is a schematic view of a gas turbine engine showing a cowling door and an engine panel that are representative engine access points.

FIG. 1B is a schematic view of the exterior of gas turbine engine 10 which shows engine panel 65 and cowling door 66. In some embodiments, gas turbine engine 10 is equipped with at least two cowling doors 66, each door 66 located on opposing sides of engine 10 and forming a portion of nacelle 26. However, other doors may be included on portions of outer casing 56. Cowling door 66 is pivotally attached to the gas turbine engine at upper end 68, being mounted near pylon 11. Similarly, one or more engine panels 65 may be incorporated into cowling door 66 or other portions of engine 10 such as outer casing 56. Each engine panel 65 is sized and configured to provide the required access to interior 64 (FIG. 1B), being limited by the structural and thermal limitations of neighboring components. Thus, electric motor 62 can be positioned within interior 64 of gas turbine engine 10 such that it can be accessed from the exterior of the engine through engine panel 65 and/or by opening at least one cowling door 66. In some embodiments, the axial region of gas turbine engine suitable for providing access to electric motor 62 from the exterior is indicated by zone 70 (see FIGS. 1A and 1B).

Figure 2:
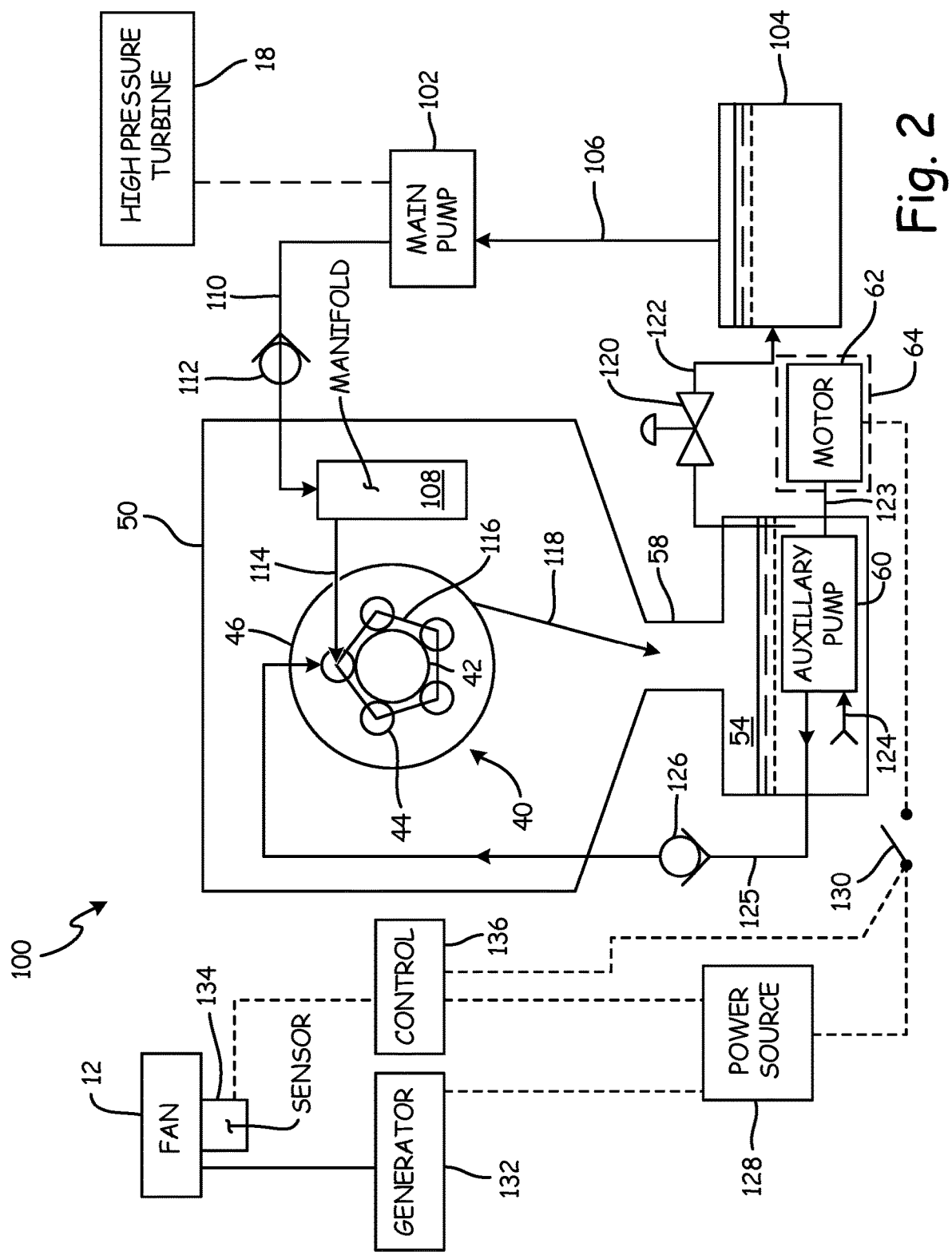
FIG. 2 is a schematic view of an auxiliary lubrication system used in conjunction with the auxiliary pump of FIG. 1A.

FIG. 2 is a schematic view of auxiliary lubrication system 100 which includes auxiliary pump 60 and electric motor 62. During operation of gas turbine engine 10, high pressure turbine 18 drives main pump 102 to draw lubrication fluid from main sump 104 through scavenge line 106. Thereafter, main pump 102 supplies lubrication fluid to manifold 108 via supply line 110. To prevent backflow through main pump 102 (e.g., when main pump 102 is not operating and lubrication fluid is supplied by auxiliary pump 60, check valve 112 is positioned along supply line 110 and oriented to prevent flow from manifold 108 to main pump 102 along supply line 110. From manifold 108, lubrication fluid flows through supply line 114 to lubrication distributor 116, which delivers lubrication to one or more bearings (not shown) supporting planet gears 44 within fan drive gearbox 40. After providing lubrication for the journal bearings (not shown), the lubrication fluid is discharged to auxiliary reservoir 54 through dump line 118.

Shuttle valve 120 is placed along return line 122 that extends from auxiliary reservoir 54 to main sump 104, permitting lubrication fluid to return to main sump 104. Shuttle valve 120 is a pressure-actuated, fail-closed valve that receives a pressure signal from manifold 108. When the pressure within manifold 108 exceeds a threshold value (e.g., the minimum design operating pressure of the main lubrication system), shuttle valve 120 is placed in an open state, allowing lubrication fluid to flow from auxiliary reservoir 54 to main sump 104 along return line 122. Conversely, when the pressure within manifold 108 is equal to or falls below the threshold value, shuttle valve 120 is placed in a closed state, preventing flow along return line 122. When shuttle valve 120 is in a closed state, lubrication fluid is retained within at least a portion of compartment 50, strut 58, and auxiliary reservoir 54. Moreover, as described with reference to FIG. 1A, auxiliary reservoir 54 is placed in relation to compartment 50 such that lubrication fluid tends to collect within auxiliary reservoir 54 when gas turbine engine 10 (FIG. 1A) is installed on a parked aircraft.

Auxiliary pump 60 is disposed within auxiliary reservoir 54 and is driven by electric motor 62 which is disposed outside auxiliary reservoir 54. In some embodiments, electric motor 62 is placed within a portion of interior 64 that is accessible from the exterior of gas turbine engine 10 via an engine panel or cowling door (see FIG. 1A). Moreover, electric motor 62 can be configured to drive auxiliary pump 60 via shaft 123. With this configuration, shaft 123 extends from interior 64 of gas turbine engine 10 to auxiliary reservoir 54, being equipped with seals and fittings as necessary to prevent lubrication fluid from escaping auxiliary reservoir 54.

When auxiliary pump 60 is driven by electric motor 62, lubrication fluid is drawn into pump 60 through inlet 124. In some embodiments, inlet 124 is immersed within lubrication fluid contained in auxiliary reservoir 54. When this inlet configuration is combined with a position of auxiliary reservoir 54 that results in gravity-fed lubrication, the quantity of lubrication fluid produces a fluid pressure at inlet 124. Therefore, auxiliary pump 60 can be configured to be self-priming. Because auxiliary pump 60 is self-priming, pump 60 can be operated at relatively low speeds such as during windmilling of fan 12.

Furthermore, auxiliary pump 60 supplies lubrication fluid along supply line 125 which extends from auxiliary reservoir 54 to lubrication distributor 116 for providing lubrication fluid to bearings of fan drive gearbox 40. To prevent reverse flow of lubrication fluid through supply line 125 from distributor 116 to auxiliary reservoir 54, check valve 126 can be positioned as such along line 125. Like the lubrication fluid provided by main pump 102, lubrication fluid discharges through dump line 118 into auxiliary reservoir 54 after lubricating bearings within fan drive gearbox 40. Thus, electric motor 62 drives auxiliary pump 60 to circulate lubrication fluid within auxiliary lubrication system 100.

Electric motor 62 receives electric power from power source 128. Power source 128 can be on-board the aircraft or can be supplied from an external source. Optionally, switch 130 can be placed within the electric circuit between power source 128 and electric motor 62 to facilitate activating and deactivating electric motor 62 and, therefore, auxiliary pump 60. Switch 130 can be manually operated or automated as will be described below.

In some embodiments, power source 128 is one or more batteries installed on board gas turbine engine 10 (FIG. 1). For example, the batteries can be installed within interior 64 of gas turbine engine 10 (FIG. 1A) or alternatively, within the aircraft to which gas turbine engine 10 is installed. Thus, electrical power stored within the battery or batteries can be used to power electric motor 60, circulating lubrication fluid within auxiliary lubrication system 100.

The batteries of power source 128, whether located on gas turbine engine 10 or its associated aircraft, can be rechargeable and configured to be charged during operation of the aircraft. These methods typically include charging batteries using one or more of an auxiliary power supply unit (APU) or generators driven by the gas turbine engines (e.g., a starter motor operated as a generator coupled to the high pressure spool).

However, auxiliary lubrication system 100 can optionally include generator 132 that is configured to be driven by the rotation of fan 12. For example, in some embodiments, generator 132 is installed on shaft 38 as shown in FIG. 1A. Referring again to FIG. 1, shaft 38 is coupled to sun gear 42, permitting generator 132 to rotate faster than fan 12, which is coupled to ring gear 46. Alternatively, generator 132 could be coupled to fan 12 directly (e.g., coupling generator 132 to ring gear 46). Although generator 132 would rotate at a slower speed than a similar generator coupled to sun gear 42, such an arrangement allows the generator to have a larger outer diameter and, thus, provides greater flexibility in designing generator 132.

In yet another optional configuration, power source 128 can be configured to supply power to electric motor 62 only when fan 12 is rotating. For instance, rotation sensor 134 can be arranged with respect to fan 12 to detect the rotation thereof. A variety of methods exist for detecting rotation including installing a proximity probe near the outer diameter of fan 12 to detect passing fan blades. Another rotation sensor 134 could include a probe installed near the inner diameter of fan 12 along a portion of ring gear 46. Whatever configuration of rotation sensor 134 used, sensor 134 is configured to send a signal to controller 136 when rotation of fan 12 is detected. Upon receiving the signal from sensor 134, controller 136 causes power source 128 to be connected or disconnected from motor 62. With this configuration, and particularly when power source 128 includes one or more batteries, the power supplied by power source 128 is intermittently applied to motor 62 to minimize power consumption. Some embodiments, however, can utilize batteries for power source 128 without switch 130 and/or sensor 134 for minimizing power consumption. In such cases, the electric power stored within the batteries will be depleted if not recharged.

Power source 128 can also include a number of external sources. For instance, power source 128 can include a receptacle for supplying power from a ground power grid. In this case, an electrical cord can connect the ground power grid to the receptacle located on the exterior of gas turbine engine 10 or its associated aircraft. Alternatively, a ground power unit (GPU) can be attached to gas turbine engine 10 or its associated aircraft to provide electrical power via power source 128. In each case, using an external power source does not allow the power to be depleted in the way batteries or other on-board powers sources can be depleted when the aircraft is parked. Such a configuration is particularly useful for engines installed on aircraft that are parked for relatively long periods of time (i.e., weeks or months) versus aircraft that are parked for relatively short periods of time (i.e., between flights during a normal service route).

Figure 3:
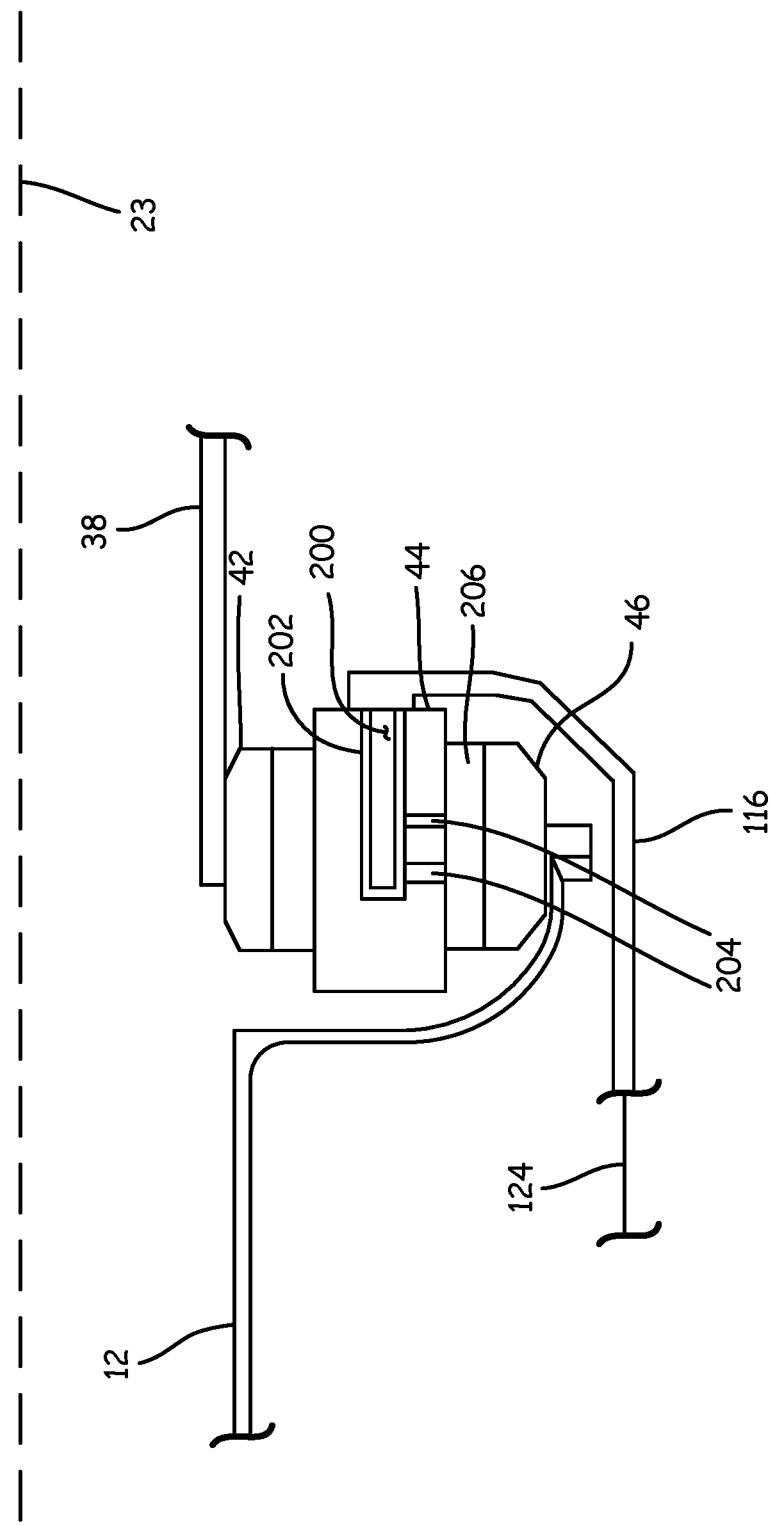
FIG. 3 is a schematic view of a bearing within a fan drive gearbox that receives lubrication from the auxiliary lubrication system of FIG. 2.

FIG. 3 is a schematic view of planet gear 44 having bearing 200 that supports planet gear 44 within fan drive gearbox 40. As described with reference to FIG. 2, auxiliary pump 60 supplies lubrication fluid to distributor 116 through supply line 124. Within distributor 116, lubrication fluid is distributed to surfaces of bearings 200, one of which is shown in FIG. 3. Likewise, other bearings 200 not shown in FIG. 3 are supplied with lubrication fluid through distributor 116.

In some embodiments, bearing 200 is a journal bearing. In such embodiments, distributor 116 is in fluid communication with axial bearing passage 202, which in turn, is in communication with radial bearing passages 204. Lubrication fluid flows through distributor 116 into axial bearing passage 202 to form a fluid film between bearing 200 and planet gear 44 that cools and lubricates mating surfaces of each component. Thereafter, the lubrication fluid flows through radial bearing passages 204 and into gear teeth 206 at the outer periphery of planet gear 44 and the inner periphery of ring gear 46. After passing through gear teeth 206, the lubrication fluid is collected and discharged into auxiliary reservoir 54 through dump line 118 as described with reference to FIG. 2. Fan 12 is coupled to an outer periphery of ring gear 46 while shaft 38 of the low pressure spool is coupled to sun gear 42 as previously described.

Discussion of Possible Embodiments

The following are non-exclusive descriptions of possible embodiments of the present invention.

A gas turbine engine according to an exemplary embodiment of this disclosure, among other possible things includes a fan rotor, a turbine rotor, a fan drive gearbox, an auxiliary pump, a supply line, and an electric motor. The fan drive gearbox includes a bearing and couples the fan rotor to the turbine rotor, which is adapted to drive the fan rotor via the fan drive gearbox. The main engine lubrication system supplies one or more sumps. The auxiliary pump is configured to circulate lubricating fluid in an auxiliary lubrication system and to supply the fan drive gearbox. The supply line fluidly connects an output of the auxiliary pump to a lubricating surface of the bearing. The electric motor is adapted to drive the auxiliary pump.

The gas turbine engine of the preceding paragraph can optionally include, additionally and/or alternatively, any one or more of the following features, configurations and/or additional components:

A further embodiment of the foregoing gas turbine engine can further include a compartment and an auxiliary reservoir. The compartment can enclose the fan drive gearbox and can be configured to receive lubrication fluid from the main lubrication system and the auxiliary lubrication system. The auxiliary reservoir can be disposed within the gas turbine engine such that, in operation, lubrication fluid collects therein. The auxiliary reservoir can communicate with the compartment, and the auxiliary pump can be disposed within the auxiliary reservoir.

A further embodiment of any of the foregoing gas turbine engines can further include an inner case, an outer case, and a strut extending from the inner case to the outer case. The outer case can be disposed radially outward from the inner case with respect to a centerline of the gas turbine engine.

A further embodiment of any of the foregoing gas turbine engines can further include an engine panel moveably connected to the gas turbine engine. The engine panel can have a closed position configured to enclose at least a portion of the gas turbine engine and an open position configured to provide access to an interior of the gas turbine engine. The electric motor can be positioned outside the auxiliary reservoir within the interior of the gas turbine engine such that it can be accessed when the engine panel is in the open position.

A further embodiment of any of the foregoing gas turbine engines, wherein the engine panel is a cowling door pivotally attached to the gas turbine engine.

A further embodiment of any of the foregoing gas turbine engines can further include a controller and a sensor. The sensor can be adapted to detect rotation of the fan rotor and transmit a signal to the controller when the fan rotor rotates. The controller can be configured to supply power to the electric motor, and thereby drive the auxiliary pump, so long as the sensor detects rotation of the fan rotor.

A further embodiment of any of the foregoing gas turbine engines, wherein upon receiving the signal from the sensor, the controller can supply power to the electric motor only when a rotation speed of the fan rotor is between zero revolutions per minute and sixty revolutions per minute.

A further embodiment of any of the foregoing gas turbine engines, wherein the electric motor can receive power from a ground auxiliary power unit.

A further embodiment of any of the foregoing gas turbine engines, wherein the electric motor can receive power from a cable connecting the electric motor to a ground power grid.

A further embodiment of any of the foregoing gas turbine engines, wherein the electric motor can receive power from a rechargeable battery mounted to the gas turbine engine.

A further embodiment of any of the foregoing gas turbine engines can further include a generator configured to produce electric power. The generator can be coupled to the fan rotor such that rotating of the fan rotor drives rotation of the generator. The rechargeable battery can receive electric power from the generator when the fan rotor rotates.

A further embodiment of any of the foregoing gas turbine engines, wherein the gas turbine engine can be mounted to an aircraft, and the electric motor can receive power from batteries mounted within the aircraft.

A further embodiment of any of the foregoing gas turbine engines can further include a return line, a shuttle valve, a valve sensor, and a controller. The return line can connect the compartment to the main lubrication system. The shuttle valve can be disposed along the return line. The shuttle valve can be actuated to an open state when a pressure of the main lubrication system exceeds a threshold valve and to a closed state when the pressure is less than the threshold valve. The closed position of the shuttle valve can isolate the compartment from the main lubrication system such that lubrication fluid is retained within the auxiliary reservoir. The valve sensor can detect the open and closed states of the shuttle valve. The controller can be configured to receive signals from the valve sensors. The controller can supply power to the electric motor when the valve sensor indicates a closed state of the shuttle valve.

A method of lubricating a journal bearing according to an exemplary embodiment of this disclosure, among other possible things includes supplying power to an electric motor configured to drive an auxiliary pump and using the auxiliary pump to supply lubricating fluid to a journal bearing of the gearbox. The gearbox can have an input shaft coupled to and driven by a turbine rotor and an output shaft coupled to a fan rotor of a gas turbine engine.

The method of the preceding paragraph can optionally include, additionally and/or alternatively, any one or more of the following features, configurations and/or additional components:

A further embodiment of the foregoing method can further include detecting rotation of the fan rotor and supplying power to the electric motor only when rotation of the fan rotor is detected.

A further embodiment of any of the foregoing methods can further include using a generator coupled to the fan rotor to generate electrical power and to recharge a battery. The batter can be used to supply power to the electric motor.

A further embodiment of any of the foregoing methods, wherein power can be supplied to the electric motor only when a rotational speed of the fan rotor is between zero revolutions per minute and sixty revolutions per minute.

A turbofan engine according to an exemplary embodiment of this disclosure, among other possible things includes a fan rotor, a turbine rotor, a gearbox, an auxiliary pump, and an electric motor. The gearbox couples the fan rotor and the turbine rotor, and the turbine rotor is adapted to drive the fan rotor via the gearbox. The auxiliary pump can be configured to circulate lubricating fluid in an auxiliary lubrication system and to supply the gearbox. The electric motor is configured to receive electricity when the aircraft is parked and adapted to drive the auxiliary pump, the auxiliary pump circulating a lubricating fluid while the aircraft is parked.

The turbofan engine of the preceding paragraph can optionally include, additionally and/or alternatively, any one or more of the following features, configurations and/or additional components:

A further embodiment of the foregoing turbofan engine can further include a compartment and an auxiliary reservoir. The compartment can enclose the gearbox and can be configured to receive lubrication fluid from the main lubrication system and the auxiliary lubrication system. The auxiliary reservoir can be disposed relative to the compartment such that when the turbofan engine is installed on the aircraft that is parked, lubrication fluid from the compartment collects within the auxiliary reservoir. The auxiliary pump can be disposed within the auxiliary reservoir such that an inlet of the auxiliary pump is immersed by lubrication fluid collected therein.

A further embodiment of any of the foregoing turbofan engines, wherein the electric motor can be positioned outside the auxiliary reservoir such that it is a line replacement unit.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A gas turbine engine comprising:
a fan rotor;
a low pressure turbine rotor;
a high pressure turbine rotor in an axial flow arrangement with the low pressure turbine rotor;
a fan drive gearbox coupled to the fan rotor and the low pressure turbine rotor, wherein the low pressure turbine rotor is adapted to drive the fan rotor via the fan drive gearbox, the fan drive gearbox comprising:
a bearing;
a main lubrication system configured to supply one or more sumps;
an auxiliary pump configured to circulate lubricating fluid in an auxiliary lubrication system, wherein the auxiliary lubrication system supplies the fan drive gearbox;
a supply line fluidly connecting an output of the auxiliary pump to a lubricating surface of the bearing;
an electric motor adapted to drive the auxiliary pump;
a controller; and
a sensor adapted to detect windmilling rotation of the fan rotor, wherein the sensor transmits a signal to the controller when the windmilling fan rotor rotates, and wherein so long as the sensor detects rotation of the windmilling fan rotor at a speed that is less than a threshold speed of sixty revolutions per minute, the controller is configured to supply power to the electric motor intermittently, thereby driving the auxiliary pump intermittently.

2. The gas turbine engine of claim 1, and further comprising:
a compartment enclosing the fan drive gearbox and configured to receive lubrication fluid from the main lubrication system and the auxiliary lubrication system; and
an auxiliary reservoir disposed within the gas turbine engine such that, in operation, lubrication fluid collects therein, wherein the auxiliary reservoir communicates with the compartment, and wherein the auxiliary pump is disposed within the auxiliary reservoir.

3. The gas turbine engine of claim 2, and further comprising:
an inner case;
an outer case disposed radially outward from the inner case with respect to a centerline of the gas turbine engine; and
a strut extending from the inner case to the outer case, wherein walls of the strut form at least a portion of the auxiliary reservoir.

4. The gas turbine engine of claim 2, and further comprising:
an engine panel moveably connected to the gas turbine engine such that the engine panel has a closed position configured to enclose at least a portion of the gas turbine engine and an open position configured to provide access to an interior of the gas turbine engine;
wherein the electric motor is positioned outside the auxiliary reservoir within the interior of the gas turbine engine and is accessible and removable when the engine panel is in the open position and while the auxiliary reservoir remains attached to the gas turbine engine.

5. The gas turbine engine of claim 4, wherein the engine panel is a cowling door pivotally attached to the gas turbine engine.

6. The gas turbine engine of claim 2, and further comprising:
a return line fluidly connecting the auxiliary reservoir to the main lubrication system;
a shuttle valve disposed along the return line that is actuated to an open state when a pressure of the main lubrication system exceeds a threshold value and actuated to a closed state when the pressure is less than the threshold value, wherein the closed position of the shuttle valve isolates the compartment from the main lubrication system such that lubrication fluid is retained within the auxiliary reservoir.

7. The gas turbine engine of claim 1, wherein the electric motor receives power from a ground auxiliary power unit.

8. The gas turbine engine of claim 1, wherein the electric motor receives power from a cable connecting the electric motor to a ground power grid.

9. The gas turbine engine of claim 1, wherein the electric motor receives power from a rechargeable battery mounted to the gas turbine engine.

10. The gas turbine engine of claim 9, and further comprising:
a generator configured to produce electric power, wherein the generator is coupled to the fan rotor such that rotation of the fan rotor drives rotation of the generator;
wherein the rechargeable battery receives electric power from the generator when the fan rotor rotates.

11. The gas turbine engine of claim 1, wherein the gas turbine engine is mounted to an aircraft, and wherein the electric motor receives power from batteries mounted within the aircraft.

12. A turbofan engine installed on an aircraft, the turbofan engine comprising:
a fan rotor;
a low pressure turbine rotor;
a high pressure turbine rotor in an axial flow arrangement with the low pressure turbine rotor;

a fan drive gearbox coupled to the fan rotor and the low pressure turbine rotor, wherein the low pressure turbine rotor is adapted to drive the fan rotor via the fan drive gearbox, the fan drive gearbox comprising:

a bearing;

a main lubrication system configured to supply one or more sumps;

an auxiliary pump configured to circulate lubricating fluid in an auxiliary lubrication system supplying the fan drive gearbox;

an electric motor configured to receive electricity when the aircraft is parked and adapted to drive the auxiliary pump;

a controller; and a sensor adapted to detect windmilling rotation of the fan rotor, wherein the sensor transmits a signal to the controller when the windmilling fan rotor rotates at a speed less than a predetermined threshold speed, wherein so long as the sensor detects windmilling rotation of the fan rotor less than the predetermined threshold speed of sixty revolutions per minute, the controller is configured to supply power to the electric motor intermittently, thereby driving the auxiliary pump intermittently to circulate a lubricating fluid within the auxiliary lubrication system while the aircraft is parked.

13. The turbofan engine of claim 12, and further comprising:

a compartment enclosing the gearbox and configured to receive lubrication fluid from the main lubrication system and the auxiliary lubrication system; and an auxiliary reservoir disposed relative to the compartment such that when the turbofan engine is installed on the aircraft that is parked lubrication fluid from the compartment collects within the auxiliary reservoir, wherein the auxiliary pump is disposed within the auxiliary reservoir such that an inlet of the auxiliary pump is immersed by lubrication fluid collected therein.

14. The turbofan engine of claim 12, wherein the electric motor is positioned outside the auxiliary reservoir, and wherein the electric motor is a line replaceable unit.

* * * * *